T. C. DUNN & G. J. VOUGHT.
ANIMAL TRAP.
APPLICATION FILED DEC. 31, 1908.
936,429.
Patented Oct. 12, 1909.
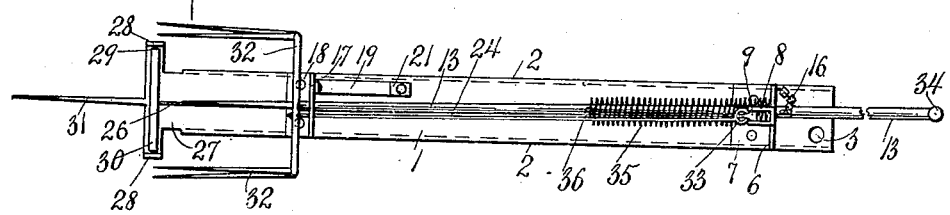
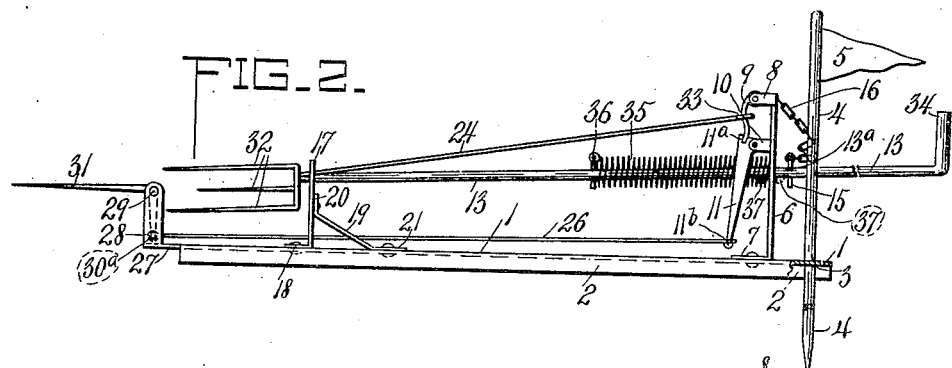
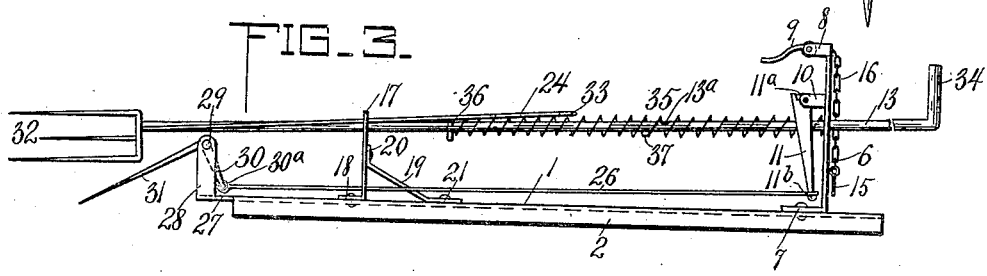
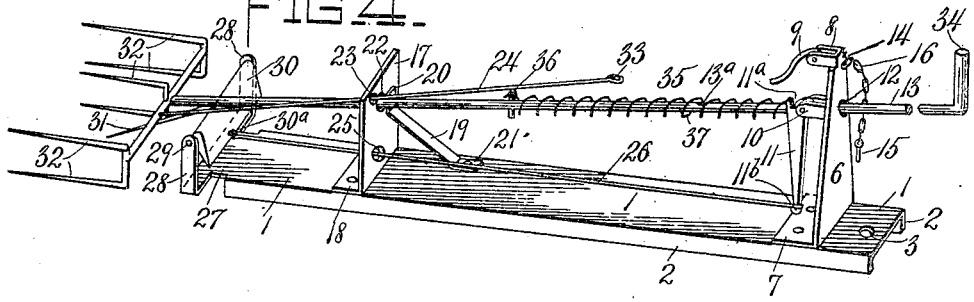
Witnesses
M. Cleo Umstead
Chas E Gear
Inventors
Thomas C. Dunn
George J. Vought
By H. W. Stackpole
Attorney

UNITED STATES PATENT OFFICE.

THOMAS C. DUNN, OF CLAY CENTER, KANSAS, AND GEORGE J. VOUGHT, OF HARMAR-VILLE, PENNSYLVANIA; SAID DUNN ASSIGNOR TO SAID VOUGHT.

ANIMAL-TRAP.

936,429.

Specification of Letters Patent.

Patented Oct. 12, 1909.

Application filed December 31, 1908. Serial No. 470,270.

*To all whom it may concern:*

Be it known that we, THOMAS C. DUNN and GEORGE J. VOUGHT, citizens of the United States, residing at Clay Center, in the county of Clay and State of Kansas, and at Harmarville, in the county of Allegheny and State of Pennsylvania, respectively, have invented certain new and useful Improvements in Animal-Traps, of which the following is a specification.

Our invention relates to animal traps and is especially designed for the catching of gophers.

The objects are to provide an effective horizontally arranged trap which may be placed in the run of the animal that in pressing forward the earth, as is its custom, the trap will be sprung and sharp prongs caused to be forcibly projected horizontally in the direction from which the earth is being propelled and the animal impaled thereon.

The device is preferably constructed in the manner hereinafter described and illustrated in the accompanying drawing in which—

Figure 1 is a plan view of the trap in set position. Fig. 2 is a side elevation of the same, the safety pin and the anchoring stake being shown in position. Fig. 3 is a side elevation of the trap after it has been sprung. Fig. 4 is a perspective view of the same.

Similar figures of reference indicate like parts throughout the several views.

1 is an elongated base plate, preferably of galvanized sheet iron, the side edges being bent downward to form stiffening flanges 2 which are adapted to penetrate the ground and hold the trap from lateral movement. At one end of the base plate is a hole 3 through which is passed an anchoring signal stake 4 which may carry a flag or pennant 5 to readily locate the trap's position in a field.

6 is a rear standard, preferably of sheet metal, the foot 7 of which is fastened to the base plate, the top portion of the standard being bent to form bearings 8 for the trunnions of a curved finger 9. Intermediate of the ends of the standard is located a plate bearing 10 for the trunnions of a trigger 11, which trigger is provided at its upper or pivoted end with a notch $11^a$ for receiving the free end of the curved finger 9, and at its lower or free end with a knob $11^b$. Hole 12 in the standard permits the passage of the horizontally arranged thrust shaft 13 and hole 14 the attachment of a safety pin 15 by means of chain 16.

17 is a standard secured by foot 18 and braced by a strip 19, secured to the standard and base at bent portions 20 and 21, respectively. The forward standard has perforations 22 for the passage of the shaft 13 and 23 for the passage of the hold back rod or wire 24 through its upper portion and perforation 25 through its lower portion for the passage of the push rod or wire 26.

27 is an extension of the base plate 1 having upturned ears 28 furnishing a pivot bearing for the trunnions 29 of the push block 30 and attached bait pin 31. The push block 30 and the bait pin 31, which is rigidly secured thereto, has operable connection with the push rod 26 through a ring and eye at $30^a$.

32 is a multi-pronged head to which is attached one end of the hold back rod 24 and shaft 13, the opposite end of the hold back rod being formed into an eye 33 and the opposite end of the shaft 13 being turned up to form a handle 34. The shaft is further provided with a spring 35 retained between the near side of the standard 6 and a stop or pin 36 passed through or formed on the shaft 13. A catch 37 serves to restrain and the pin 15 to secure shaft 13 against forward movement while the trap is being set.

In practice, the trap being in the passive condition illustrated in Figs. 3 and 4 is set as follows:—Handle 34 is pulled until the catch 37, passing through hole 12, catches on the edge thereof. Pin 15 is then slipped into the hole $13^a$ in the shaft provided for that purpose to secure the trap against accidental discharge. Finger 9 is passed through eye 33 and caught in notch $11^a$. The block 30 and bait pin 31 are then in the position illustrated in Figs. 1 and 2, the moving parts of the device remaining in the same position after the withdrawal of pin 15 and the gentle release of the catch 37 by a slight upward pull on the handle 34, until an animal, disturbing the bait on the bait pin 31 or passing the bait and moving forward against push block 30, causes the push rod 26 to move forward and, by its attachment to the knob $11^b$ on the trigger 11, causes the trigger to release the finger 9 and the eye 33, permitting the force of the spring 35 to thrust the shaft and its attached parts, into the position shown in Figs. 3 and 4, and impale the animal.

Having thus described my invention the following is what I claim as new therein and desire to secure by Letters Patent:

A horizontally arranged shaft comprising a base plate having rear and forward standards, a horizontally arranged thrust shaft mounted in the standards, having an impaling head at its forward end, and a catch at its rear end, a spring for throwing out the thrust shaft, a finger pivoted to the rear standard, a trigger pivoted to the rear standard beneath the finger and having a notch with which the finger is adapted to engage, a hold back rod connected at its forward end with the impaling head and adapted to be engaged by the finger at its rear end, a push block pivoted to the forward end of the base plate, and a push rod connected at its forward end with the push block and at its rear end with the trigger.

In testimony whereof, we have signed our names to this specification in the presence of two subscribing witnesses.

THOMAS C. DUNN.
GEORGE J. VOUGHT.

Witnesses:
FRANK O. OBERG,
L. K. CRANDALL.